United States Patent
Sole et al.

(10) Patent No.: US 8,159,606 B2
(45) Date of Patent: Apr. 17, 2012

(54) METHOD AND APPARATUS FOR REVERSIBLE, POLYNOMIAL BASED IMAGE SCALING

(75) Inventors: Joel Sole, Plainsboro, NJ (US); Joan Llach, Princeton, NJ (US)

(73) Assignee: Thomson Licensing, Boulogne-Billancourt (FR)

(*) Notice: Subject to any disclaimer, the term of this patent is extended or adjusted under 35 U.S.C. 154(b) by 416 days.

(21) Appl. No.: 12/460,814

(22) Filed: Jul. 24, 2009

(65) Prior Publication Data

US 2010/0026887 A1    Feb. 4, 2010

Related U.S. Application Data

(60) Provisional application No. 61/086,028, filed on Aug. 4, 2008.

(51) Int. Cl.
*H04N 7/01* (2006.01)
*H04N 11/20* (2006.01)

(52) U.S. Cl. ........ 348/441; 348/581; 348/565; 348/588; 348/571; 348/458; 348/445; 345/660; 345/472

(58) Field of Classification Search ................. 348/441, 348/581, 565, 588, 571, 458, 445; 345/660, 345/472
See application file for complete search history.

(56) References Cited

U.S. PATENT DOCUMENTS

| | | | |
|---|---|---|---|
| 5,834,761 A * | 11/1998 | Okada et al. .......... 250/208.1 |
| 6,847,738 B1 | 1/2005 | Scognamiglio et al. |
| 6,912,255 B2 | 6/2005 | Drezner et al. |
| 7,003,173 B2 | 2/2006 | Deshpande |
| 7,068,722 B2 | 6/2006 | Wells |
| 7,170,933 B2 | 1/2007 | Kouloheris et al. |
| 7,362,810 B2 | 4/2008 | Wang |
| 2004/0075769 A1 * | 4/2004 | Shy et al. .......... 348/565 |
| 2006/0221246 A1 * | 10/2006 | Yoo .......... 348/581 |
| 2007/0035663 A1 * | 2/2007 | Lee .......... 348/552 |
| 2007/0273795 A1 * | 11/2007 | Jaynes et al. .......... 348/745 |
| 2008/0012989 A1 * | 1/2008 | Kim .......... 348/588 |
| 2008/0025616 A1 * | 1/2008 | Bryll .......... 382/209 |

FOREIGN PATENT DOCUMENTS

WO    WO 2007/130389    11/2007

* cited by examiner

*Primary Examiner* — Jefferey Harold
*Assistant Examiner* — Mustafizur Rahman
(74) *Attorney, Agent, or Firm* — Robert D. Shedd; Paul P. Kiel; Guy H. Eriksen (57) ABSTRACT

A method and apparatus are provided for reversible, polynomial based image scaling. The apparatus includes a video scaler for performing image scaling from a first base resolution image to a higher resolution image, and from the higher resolution image to a second base resolution image. The first and the second base resolution images are equal on a pixel-by-pixel basis for an entirety of the first and the second base resolution images. A scaling function used for the image scaling is based on a polynomial function having two or more degrees.

10 Claims, 5 Drawing Sheets

METHOD AND APPARATUS FOR REVERSIBLE, POLYNOMIAL BASED IMAGE SCALING

CROSS-REFERENCE TO RELATED APPLICATIONS

This application claims the benefit of U.S. Provisional Application Ser. No. 61/086,028 filed on Aug. 4, 2008, which is incorporated by reference herein in its entirety.

TECHNICAL FIELD

The present principles relate generally to image based scaling and, more particularly, to a method and apparatus for reversible, polynomial based image scaling.

BACKGROUND

A video scaler is a device for converting video signals from one size or resolution to another size or resolution. Converting from a low resolution (e.g., standard definition) to one of higher resolution (e.g., high definition) is known as "up-scaling" or "up-converting" a video signal. Converting from a high resolution to one of lower resolution is known as "down-scaling" or "down-converting" a video signal.

Video scaling involving lossless up-scaling and down-scaling seems to have significant potential for use in various practical applications. Such video scaling permits the up-scaling of an image or a video sequence while discarding the lower resolution version without the need to store the lower resolution version. This lossless up-scaling and down-scaling is also referred to as a reversible process.

One prior art approach addressing the problem of reversibility assures a perfect reconstruction going from low to high resolution and then back to the lower resolution. This prior art approach relies on the concept of adaptive update lifting scheme. In the adaptive update lifting scheme, one polyphase component of the original image is adaptively updated and then the remaining components of the output image are computed by means of a gradient-driven interpolation.

However, this scheme suffers from deficiencies including, for example, the following:
1. One deficiency of the above adaptive update lifting scheme relates to quality. The quality of this method is claimed to be comparable to that of the bilinear method, which is not a state-of-the-art reference. There are many algorithms that have improved quality over the bilinear method such as, for example, the bi-cubic method.
2. Another deficiency of the above adaptive update lifting scheme relates to computational cost. The scheme requires two gradient images to be computed and interpolated. Also, adaptive lifting steps are computed for a fraction of the pixels. These steps are computationally expensive.
3. Yet another deficiency of the above adaptive update lifting scheme relates to gradient computation. The gradient images are interpolated with the bilinear method. Relying on low quality filters for these intermediate results limits the quality of the final scaled image.

Figure 1:
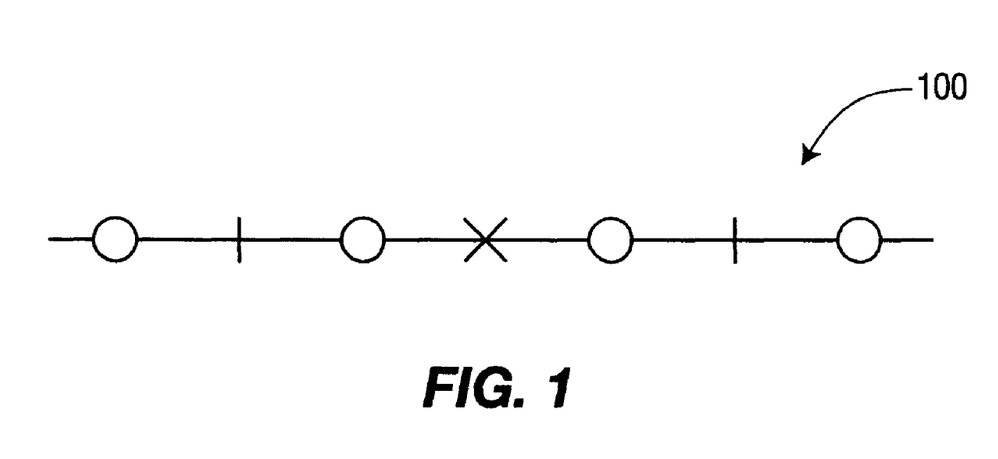
FIG. 1 is a diagram showing an example of cubic interpolation.

Bi-cubic interpolation has been used for scaling. The one-dimensional (1-D) version (the so-called cubic interpolation) fits a 1-D cubic polynomial to 4 data points. Turning to FIG. 1, an example of cubic interpolation is indicated generally by the reference numeral 100. Four pixels (indicated generally by circles) are used to interpolate a new pixel (indicated by the cross) in-between. The grid is regular (that is, there is the same distance between all of the four pixels) and the interpolated point is exactly in the middle. In this case, the cubic filter weights, denoted by f, are 9/16 for the two closest pixels and −1/16 for the two other pixels. Therefore, the interpolation filter can be written as follows:

$$f = \left( \frac{-1}{16} \; \frac{9}{16} \; \frac{9}{16} \; \frac{-1}{16} \right).$$

Figure 2:
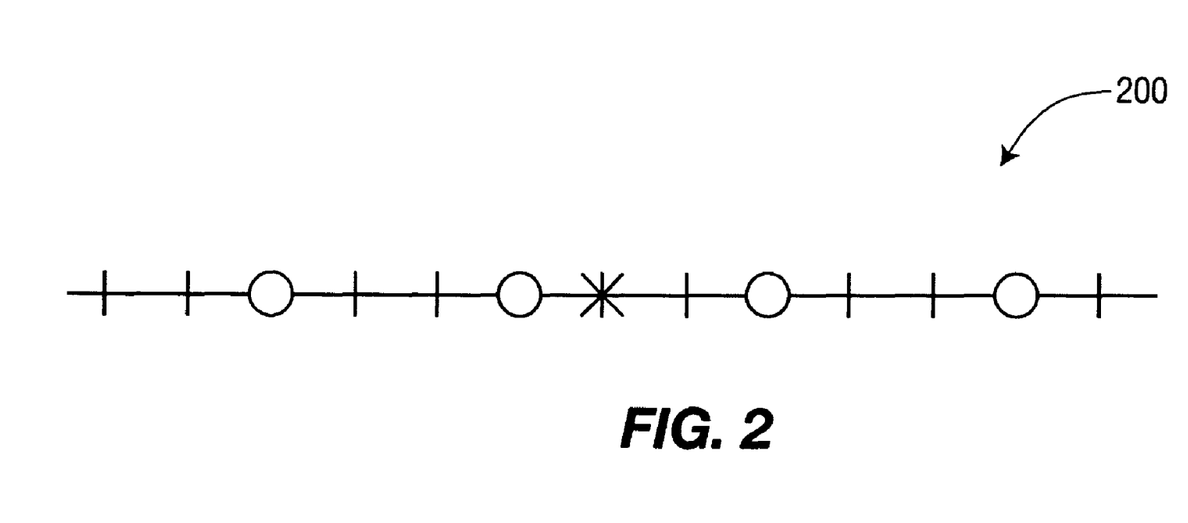
FIG. 2 is a diagram showing another example of cubic interpolation.

The cubic polynomial interpolation is also possible for non-regular grids. Also, the pixel to interpolate may be at any position, not only in the middle of the two central pixels. Turning to FIG. 2, another example of cubic interpolation is indicated generally by the reference numeral 200. In the example of FIG. 2, the four pixels (indicated generally by the circles) can be used to interpolate a new pixel (indicated by the cross) which is shifted to the left, not exactly in the middle.

Bi-cubic interpolation is the separable two-dimensional (2-D) version of the cubic. First, the 1-D cubic polynomial is used to interpolate in the horizontal direction for all the rows, and then the 1-D interpolation is done in the vertical direction for all the columns. Note that it is also possible to first filter the vertical direction and then the horizontal directions, as the results are similar for both approaches.

The bi-cubic interpolation provides good quality. The drawback is that, in general, the original data is not exactly recovered when an up-scaling is followed by a down-scaling, even in the case when no quantization is applied.

Quantization is required in finite-precision arithmetic and for efficient data storage. If quantization is introduced in the bi-cubic scaling, then the possibility to recover the original data becomes much more difficult.

Currently, no video scaling schemes exist in finite arithmetic (integer-to-integer) that are able to up-scale in a ratio of 3/2 with bi-cubic quality, and then down-scale to a ratio of 2/3 in order to recover the original data.

SUMMARY

These and other drawbacks and disadvantages of the prior art are addressed by the present principles, which are directed to a method and apparatus for reversible, polynomial based image scaling.

According to an aspect of the present principles, there is provided an apparatus. The apparatus includes a video scaler for performing image scaling from a first base resolution image to a higher resolution image, and from the higher resolution image to a second base resolution image. The first and the second base resolution images are equal on a pixel-by-pixel basis for an entirety of the first and the second base resolution images. A scaling function used for the image scaling is based on a polynomial function having two or more degrees.

According to another aspect of the present principles, there is provided a method. The method includes performing image scaling from a first base resolution image to a higher resolution image, and from the higher resolution image to a second base resolution image. The first and the second base resolution images are equal on a pixel-by-pixel basis for an entirety of the first and the second base resolution images. A scaling function used for the image scaling is based on a polynomial function having two or more degrees.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for reversible, polynomial based image scaling.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As noted above, the present principles are directed to a method and apparatus for reversible, polynomial based image scaling.

The "native resolution" of a display is refers to how many physical pixels make up each row and column of the visible area on the display's output surface. There are many different video signals in use in the world which are not the same resolution (neither are all of the displays), thus some form of resolution adaptation (video scaling) is required to properly frame a video signal to a display device. For example, within the United States, there are the national television system committee (NTSC), advanced television systems committee (ATSC), and video electronics standards association (VESA) video standards, each with several different resolution video formats.

A special case of video up-scaling and downscaling occurs for the 2:3 and 3:2 ratio. The interest in the 2:3 ratio stems from the size ratio of the two existing High Definition Television (HDTV) image formats (1280×720 and 1920×1080) and also from the ratio of HDTV with respect to the VGA format (640×480). Note that the ratio 1280/1920, 720/1080, and 480/720 is 2/3.

As noted above, video scaling involving lossless up-scaling and down-scaling seems to have significant potential for use in various practical applications. Such video scaling permits the up-scaling of an image or a video sequence while discarding the lower resolution version without the need to store the lower resolution version. This lossless up-scaling and down-scaling is also referred to as a reversible process. If the original resolution is required again, then the algorithm is able to exactly regenerate the original resolution.

Figure 3:
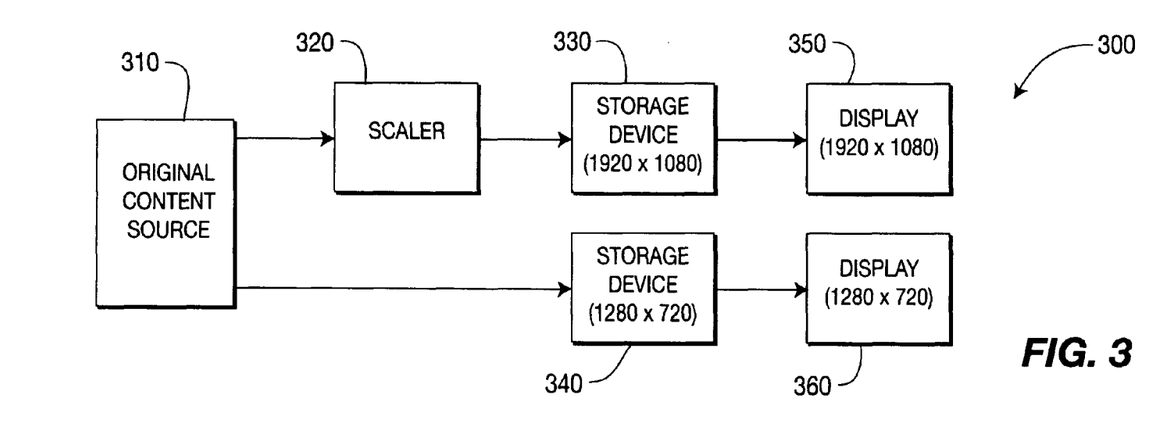
FIG. 3 is a block diagram showing a system for performing video scaling where both the source and the target resolution are capable of being stored, in accordance with an embodiment of the present principles.

Turning to FIG. 3, a system for performing video scaling where both the source and the target resolution are capable of being stored is indicated generally by the reference numeral 300. As used herein, the phrase "source resolution" refers to the resolution that is to be scaled, while the phrase "target resolution" refers to the resultant resolution that is obtained after scaling. The system 300 includes an original content source 310 having a first output connected in signal communication with an input of a scaler 320 and a second output connected in signal communication with an input of a second storage device 340 (for storing, e.g., 1280×720 resolution images). An output of the scaler 320 is connected in signal communication with an input of a first storage device 330 (for storing, e.g., 1920×1080 resolution images). An output of the first storage device 330 is connected in signal communication with an input of a first display device 350 (for displaying images having a resolution of 1920×1080). An output of the second storage device 340 is connected in signal communication with an input of a second display device 360 (for displaying images having a resolution of 1280×720).

Figure 4:
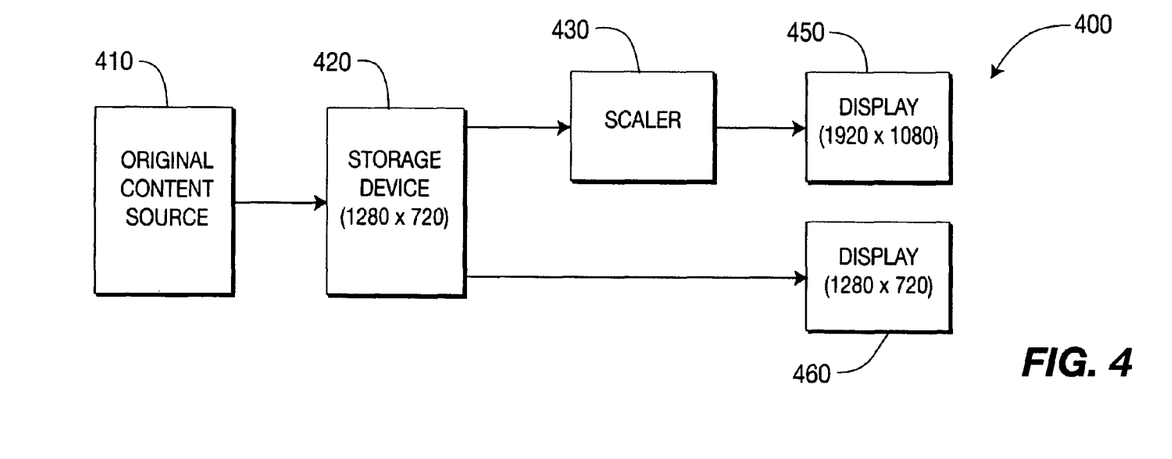
FIG. 4 is a block diagram showing a system for performing video scaling where only one of the source resolution and the target resolution are capable of being stored, in accordance with an embodiment of the present principles.

Turning to FIG. 4, a system for performing video scaling where only one of the source resolution and the target resolution are capable of being stored is indicated generally by the reference numeral 400.

The system 400 includes an original content source 410 having an output connected in signal communication with an input of a storage device 420 (for storing, e.g., 1280×720 resolution images). A first output of the storage device 420 is connected in signal communication with an input of a scaler 430. An output of the scaler 430 is connected in signal communication with an input of a first display device 450 (for displaying images having a resolution of 1920×1080). An output of the storage device 420 is connected in signal communication with an input of a second display device 460 (for displaying images having a resolution of 1280×720).

System 400 is typically used, for example, in some situations/applications where the storage of both resolutions (i.e., both the source and target resolutions) may be too expensive. Accordingly, system 400 allows for the storage of one resolution and guarantees that the other resolution can be exactly recovered. In such a situation (FIG. 4), only one resolution is stored and the scaling is done whenever it is necessary to recover the other resolution. For instance, in FIG. 4, scaling is performed prior to transmission. Another situation can be envisaged in which the same resolution is sent to all the displays, and the scaling is performed at the display set (after transmission) to show the image at the right display resolution.

Thus, we have developed a video scaling scheme (in finite arithmetic) that scales with bi-cubic quality and is reversible. The present principles make use of poly-phase decomposition of the cubic interpolation with a convenient choice of the interpolating pixels/coefficients, and also use the rounding operation at the appropriate points. Thus, implementations of the present principles are able to change the resolution of digital images while maintaining the following properties:

1. One property that is maintained is scaling. The algorithm can increase and decrease the image resolution.
2. Another property that is maintained is lossless up-/down-scaling. If the image resolution is increased, then the algorithm is able to recover the original image without losing information (exact recovery).
3. Yet another property that is maintained is lossless under quantization. Usually, quantization is applied after the up- and down-scaling processes. Therefore, the scaling algorithms are integer-to-integer in practice. Even in this case, property 2 still holds for our algorithm. This is the reason of calling it "reversible".
4. Moreover, another property that is maintained is the use of 3/2 and 2/3 ratios. The re-sampling can be done by any fractional factor P/Q, where P denotes the numerator in a ratio represented by P/Q and Q denotes the denominator. We have worked on cases relating to 3/2 and 2/3 ratios.
5. Further, another property that is maintained is bi-cubic quality. The re-sampling process provides good quality that is subjectively pleasant and similar to already existing "quantization lossy" algorithms. The basis of the algorithm is bi-cubic interpolation, and the quality obtained by the present principles is similar to that obtained using bi-cubic interpolation.
6. Also, another property that is maintained is low computational cost. A desired property is that the present principles do not significantly increase the computational cost with respect to usual scaling algorithms like bi-cubic.

Therefore, using the algorithm, a high definition television (HDTV) image having a resolution of 1280×720 image can be up-scaled to 1920×1080 resulting in a good quality image. Later on, if necessary, the up-scaled image can be down-scaled again to 1280×720 exactly retrieving the original image. The same can be done from video graphics array (VGA) resolution to a HDTV resolution of, for example, 1280×720. In the vertical direction the ratio is 3/2, so our algorithm can be applied. In the horizontal direction the ratio is 1280/640, i.e., 2/1. This ratio permits us to retrieve the original information directly, because one of every two pixels in the HDTV format is exactly a pixel in the VGA format. Fractional scaling is also possible for VGA resolution to 1920×1080 HDTV resolution: 1920/640 has a 3/1 ratio, which permits us to retrieve the original information directly, as for the 2/1 ratio; and 1080/480 has a 9/4 ratio and therefore can be performed in a reversible manner.

The present principles are constructed on the basis of the bi-cubic interpolation in order to achieve a lossless 3/2 up-scaling and down-scaling, even under integer quantization. A similar approach can be applied to ratios different from 3/2, e.g., 9/4. In that case, the described method and interpolation polynomials would change, but the basic structure of the algorithm would remain the same. The right polynomials should be found according to the descriptions given below with the adequate properties (coefficient value constraints and filter length).

Thus, the present principles advantageously provide a method and apparatus for reversible image scaling from a first base resolution image to a higher resolution image, with the capability to restore resolution back to a second base resolution image. In an embodiment, the first and second base resolution images are equal on a pixel-by-pixel basis for the entire image, and the scaling function is based upon a polynomial function having greater than, or equal to, two (2) degrees. Of course, the present principles are not limited to only two degrees and, thus, more than two degrees may also be used, while maintaining the spirit of the present principles. In an embodiment, the polynomial is normalized and possesses at least one coefficient of the normalized polynomial function that has an absolute value greater than (or equal to) one (1).

Figure 5:
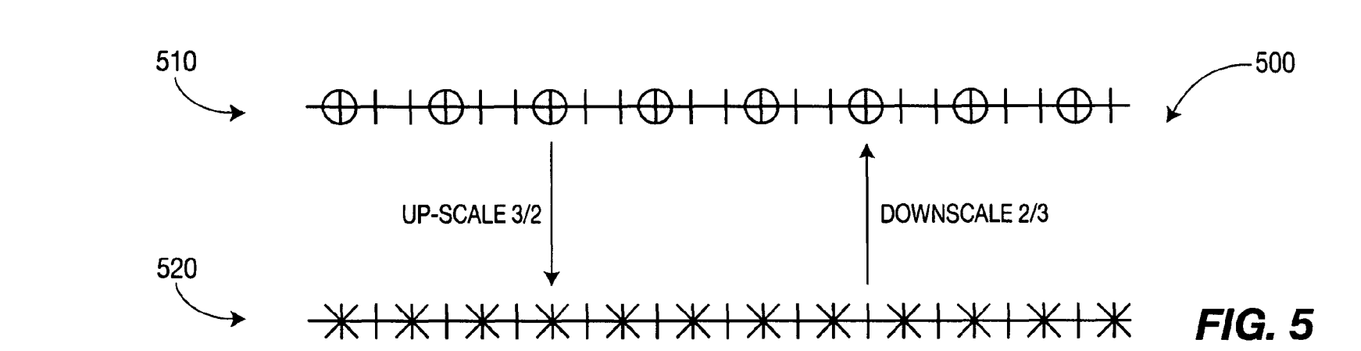
FIG. 5 is a diagram showing exemplary one-dimensional (1-D) grids for 3/2 ratio up-scaling and 2/3 ratio downscaling, in accordance with an embodiment of the present principles.

Turning to FIG. 5, exemplary one-dimensional (1-D) grids for 3/2 ratio up-scaling and 2/3 ratio downscaling are indicated generally by the reference numeral 500. In particular, the 3/2 ratio up-scaling grid is indicated by the reference numeral 520, and the 2/3 ratio downscaling grid is indicated generally by the reference numeral 510. The original image is represented by the 2/3 ratio downscaling grid 510, where the circles depict the position of every pixel. The 2/3 ratio downscaling grid 510 represents a column or a row of the image. The processing is done 1-D, first by rows and then by columns or the other way around. Since the processing is essentially 1-D, there is no need to represent 2-D grids in the figures. The 3/2 ratio up-scaling grid 520 is the destination (or target) grid, where the crosses depict the position of the interpolated pixels. The method generates pixels in the 3/2 ratio up-scaling grid 520 (at the positions of the crosses) from the set of pixels in the 2/3 ratio downscaling grid 510. The algorithm also specifies the down-scaling, that is, the way to exactly recover the down-scale pixels (located at the positions of the circles) in the 3/2 ratio up-scaling grid 520 from the pixels (located at the positions of the crosses) of the up-scaled image.

Figure 6:
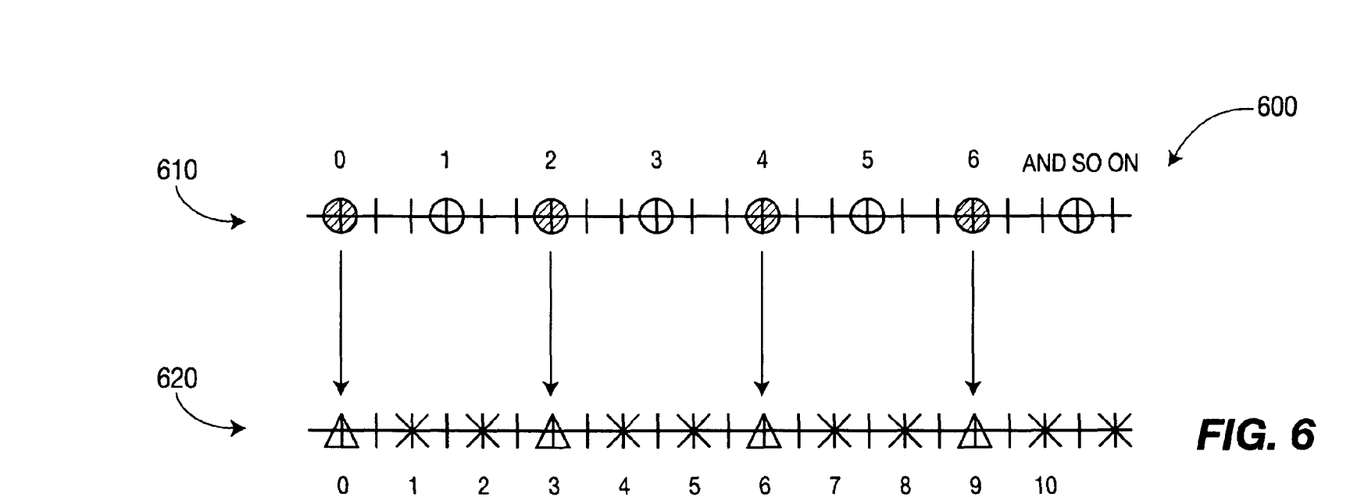
FIG. 6 is a diagram showing an example of up-scaling involving the interpolation of pixels at the 3n positions, in accordance with an embodiment of the present principles.

Note that one of every two pixels in the original image can be found in the up-scaled image. FIG. 6 illustrates this fact. Turning to FIG. 6, an example of upscaling involving the interpolation of pixels at the 3n positions is indicated generally by the reference numeral 600. In the example, n is an integer greater than, or equal to, 0. The up-scaling involves a source grid 610 and a target grid 620. The 3n positions are indicated generally by triangles. The even-numbered pixels (indicated generally by hatched circles) can be found without modification at the 3n positions for n=0, 1, 2 . . . (triangles).

In an embodiment, let the low resolution image pixels be denoted by l[n] and the high resolution image pixels be denoted by u[n]. The algorithm uses the poly-decomposition of the images. The l[n] image is divided in its even and odd samples, that is, l[2n] and l[2n+1]. The u[n] image is divided into three components, that is, u[3n], u[3n+1], and u[3n+2]. In an embodiment, each of these component sets is processed differently, but pixels within each component set are processed in the same manner. This approach allows efficient implementation and in-place computations (which imply memory savings), because pixels in each set can be independently processed.

We have that u[3n]=l[2n] for all n. Therefore, only the pixels in the up-scaled image at positions 3n+1 and 3n+2 (indicated generally by crosses and the reference numeral 630 in FIG. 6) have to be generated. The process is as follows. First, pixels u[3n+2] are generated by means of a cubic polynomial interpolation using pixels $l_S[n]$:

$$l_S[n]=(l[2n]l[2n+1]l[2n+2]l[2n+3]).$$

The weights of the filter are as follows:

$$f_1 = \left(\frac{-5}{81} \frac{60}{81} \frac{30}{81} \frac{-4}{81}\right).$$

Figure 7:
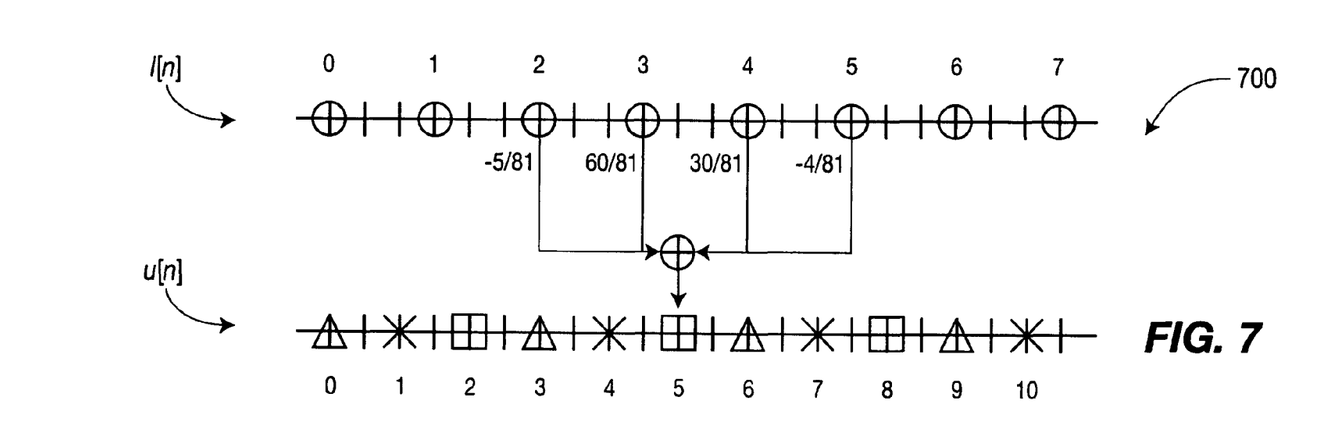
FIG. 7 is a diagram showing an example of up-scaling involving interpolation of pixels at 3n+2 positions, in accordance with an embodiment of the present principles.

These weights come from the polynomial interpolation at positions 0, 1, 2, and 3 in order to interpolate the position 4/3 (note that the points at l[2n], l[2n+1], l[2n+2], and l[2n+3] have exactly this relationship with respect to the point u[3n+2]). FIG. 7 depicts this step. Turning to FIG. 7, an example of upscaling involving interpolation of pixels at 3n+2 positions is indicated generally by the reference numeral 700. As noted above, the low resolution image pixels are denoted by l[n] and the high resolution image pixels are denoted by u[n]. The 3n+2 positions are generally indicated by squares. A rounding is applied after the multiplication in order to have an integer interpolated value at position 3n+2. Therefore, the output values at 3n+2 are computed as follows:

$$u[3n+2]=\text{round}(f_1 \cdot l_S^T[n]).$$

After that, pixels at positions 3n+1 have to be calculated. To do so, the cubic polynomial at points 2, 3, 9/2, and 5 are used to interpolate position 4. The corresponding weights are as follows:

$$f_2 = \left(\frac{-1}{15} \frac{5}{15} \frac{16}{15} \frac{-5}{15}\right)$$

Figure 8:
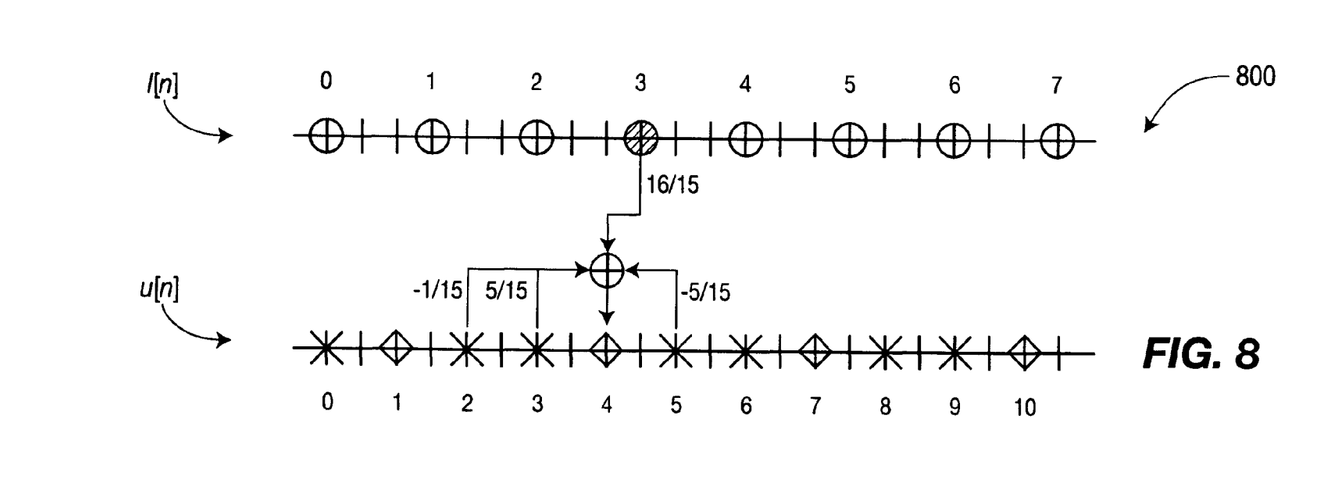
FIG. 8 is a diagram showing an example of up-scaling involving interpolation of pixels at 3n+1 positions, in accordance with an embodiment of the present principles.

FIG. 8 shows this interpolation. Turning to FIG. 8, an example of upscaling involving interpolation of pixels at 3n+1 positions is indicated generally by the reference numeral 800. As noted above, the low resolution image pixels are denoted by l[n] and the high resolution image pixels are denoted by u[n]. The 3n+1 positions are generally indicated by diamonds. The output is as follows:

$$u[3n+1]=f_2 \cdot (u[3n-1]u[3n]l[2n+1]u[3n+2])^T.$$

As defined above, the output u[3n+1] is not an integer. However, if rounding is applied directly to this output, then the original data recovery is not possible. In order to be able to recover the original data, rounding is applied to an intermediate result. Let filter $f_2$ be divided into filter $f_3$ and weight h, that is, $$f_3 = \left(\frac{-1}{15} \frac{5}{15} \frac{-5}{15}\right) \text{ and } h = \frac{16}{15}.$$

Then, the following intermediate result is computed as follows:

$$i[3n+1] = \text{round}\left(\frac{f_3}{h} \cdot (u[3n-1]u[3n]u[3n+2])^T\right)$$

Finally, the interpolated value is obtained as follows:

$$u[3n+1]=\text{round}(h \cdot (l[2n+1]+i[3n+1])$$

Note that no pixels at position 3n+1 are used to interpolate other pixels at these positions 3n+1. Therefore, the pixels at 3n, 3n+2, and 3n+1 are obtained in distinct sequential steps, leading to possible efficient practical implementations of the algorithm. A straightforward parallelization of the algorithm would simultaneously process several pixels of the same type. Another approach would parallelize several rows/columns.

Herein below, a method according to an embodiment is presented for the steps of the 1-D up-scaling method. The up-scaling of the whole image is done by applying the 1-D algorithm in a separate way, first on one direction (vertical or horizontal) and then on the other direction.

```
1:  Input I – the lower resolution image (I[n] is the pixel at position n)
2:  Output u – a 3/2 reversible up-scaled version of I
3:  for all n do
4:      u[3n] = I[2n]
5:  end for
6:  for all n compute
7:      u[3n + 2] = round(f₁(I[2n]I[2n + 1]I[2n + 2]I[2n + 3])ᵀ)
8:  end for
9:  for all n compute
10:     u[3n + 1] =
            round(h · (I[2n + 1] + round(1/h f₃(u[3n − 1]u[3n]u[3n + 2])ᵀ)))
11: end for
``` where $$f_1 = \left(\frac{-5}{81} \frac{60}{81} \frac{30}{81} \frac{-4}{81}\right) \text{ and } f_3 = \left(\frac{-1}{15} \frac{5}{15} \frac{-5}{15}\right),$$

but as it is explained in this document, these vectors can have other values.

The algorithm is reversible because of the separate use of the poly-phase components and the choice of the interpolation points. This choice allows the rounding operations and leads to a weight $h \leq 1$, facts that enable reversibility. The exact reverse algorithm is possible because of the following equality that holds only in the case $h \leq 1$:

$$x = \text{round}\left(\frac{1}{h}\text{round}(h \cdot x)\right) \text{ for all } x \in Z,$$

wherein x denotes an input value (i.e., a pixel value) and Z denotes the set of integer numbers.

The down-scaling algorithm is simpler than the up-scaling, basically because the down-scaling algorithm involves reversing the last step done in the up-scaling algorithm, thus taking advantage of the previous equality. Then, the pixels u[3n+2] are just discarded and finally, the pixels l[2n] are set equal to the pixels u[3n].

```
1:  Input u – the upper resolution image (u[n] is the pixel at position n)
2:  Output I – a 2/3 down-scaled version of u
3:  for all n compute
4:      I[2n + 1] =
            round(1/h · u[3n + 1]) − round(1/h f₃(u[3n − 1]u[3n]u[3n + 2])ᵀ)
5:  end for
6:  for all n do
7:      I[2n] = u[3n]
8:  end for
```

Figure 9:
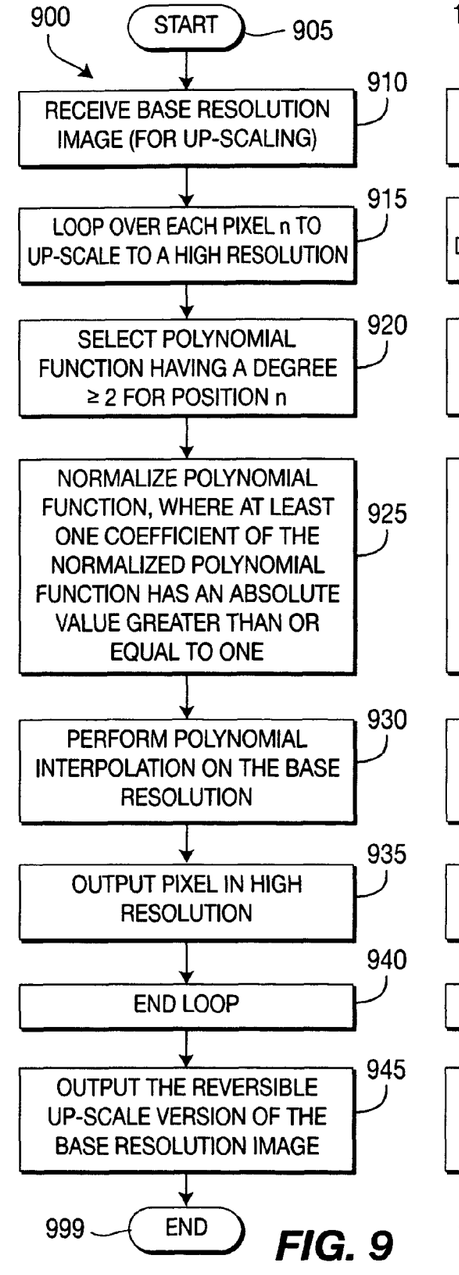
FIG. 9 is a flow diagram showing an exemplary method for polynomial based image reversible up-scaling, in accordance with an embodiment of the present principles.

Turning to FIG. 9, an exemplary method for polynomial based image reversible upscaling is indicated generally by the reference numeral 900. The method 900 includes a start block 905 that passes control to a function block 910. The function block 910 receives a base resolution image (for up-scaling), and passes control to a loop limit block 915. The loop limit block 915 begins a loop for each pixel n to be up-scaled to a high resolution, and passes control to a function block 920. The function block 920 selects a polynomial function of degree >=2 for position n, and passes control to a function block 925. The function block 925 normalizes the polynomial function, where at least one coefficient of the normalized polynomial function has an absolute value greater than or equal to one, and passes control to a function block 930. It is to be appreciated that while shown in a loop that is performed for each pixel of the base resolution image, the normalization described with respect to function block 925 may be performed only once, for example, for a first pixel being processed, with such normalization then applied to each subsequently processed pixel. The function block 930 performs polynomial interpolation on the base resolution, and passes control to a function block 935. The function block 935 outputs the pixel in high resolution, and passes control to a loop limit block 940. The loop limit block 940 ends the loop over each pixel n in high resolution, and passes control to a function block 945. The function block 945 outputs a 3/2 reversible up-scaled version of the base resolution image, and passes control to an end block 999.

Figure 10:
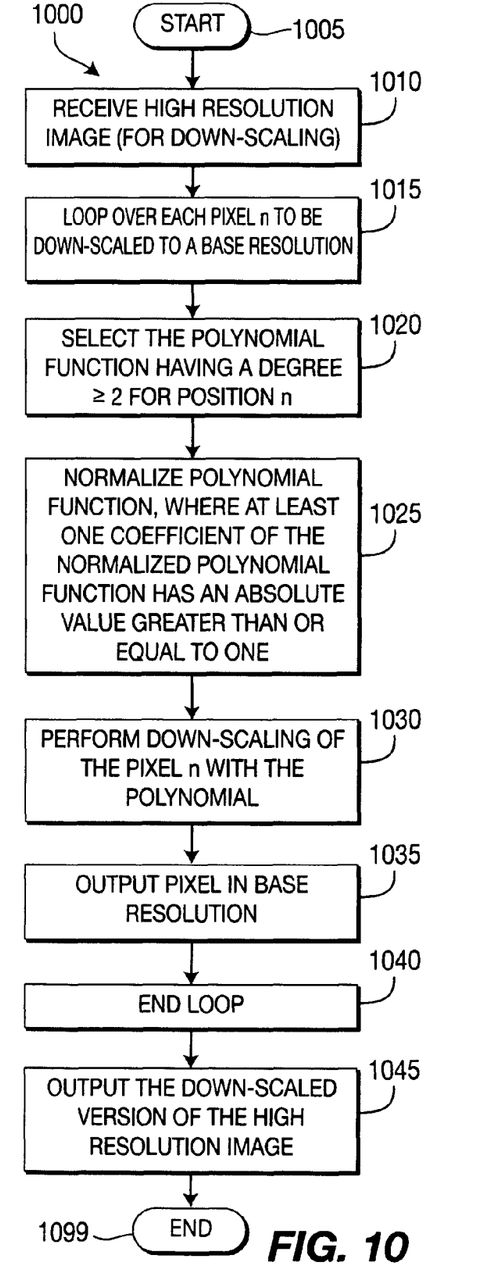
FIG. 10 is a flow diagram showing an exemplary method for polynomial based image reversible downscaling, in accordance with an embodiment of the present principles.

Turning to FIG. 10, an exemplary method for polynomial based image reversible downscaling is indicated generally by the reference numeral 1000. The method 1000 includes a start block 1005 that passes control to a function block 1010. The function block 1010 receives a high resolution image (for downscaling), and passes control to a loop limit block 1015. The loop limit block 1015 begins a loop for each pixel n to be downscaled to a base resolution, and passes control to a function block 1020. The function block 1020 selects a polynomial function of degree >=2 for position n, and passes control to a function block 1025. The function block 1025 normalizes the polynomial function, where at least one coefficient of the normalized polynomial function has an absolute value greater than or equal to one, and passes control to a function block 1030. It is to be appreciated that while shown in a loop that is performed for each pixel of the base resolution image, the normalization described with respect to function block 1025 may be performed only once, for example, for a first pixel being processed, with such normalization then applied to each subsequently processed pixel. The function block 1030 performs downscaling of the pixel n with the polynomial, and passes control to a function block 1035. The function block 1035 outputs the pixel in the base resolution, and passes control to a loop limit block 1040. The loop limit block 1040 ends the loop over each pixel n in the base resolution, and passes control to a function block 1045. The function block 1045 outputs a 2/3 downscaled version of the high resolution image, and passes control to an end block 1099.

A description will now be given regarding additional considerations with respect to polynomial based image reversible scaling in accordance with the present principles. It is to be appreciated that no ordering of importance is implied by the numbering of the following additional considerations.

With respect to a first exemplary additional consideration with respect to polynomial based image reversible scaling, the border treatment can be the usual in this type of processing. The signal can be extended by mirroring, padding with a known value, making it periodic, and so forth.

With respect to a second exemplary additional consideration with respect to polynomial based image reversible scaling, any other polynomial interpolation that has a coefficient higher than 1 and that does not use other poly-phase components (that is, only one pixel of the grid being updated) can be used. Two other examples of such interpolation are given below:

The cubic interpolation of $-\frac{1}{3}$ using the points $-1, 0, 1$, and 2. In this case, the filter has the weights $$f = \left(\frac{14}{81} \frac{84}{81} \frac{-21}{81} \frac{4}{81}\right).$$

The cubic interpolation of 2 using the points 0, 3, 4, and 6. In this case, the filter has the weights $$f = \left(\frac{1}{9} \frac{16}{9} \frac{-9}{9} \frac{1}{9}\right).$$

With respect to a third exemplary additional consideration with respect to polynomial based image reversible scaling, not only cubic polynomials can be applied in this setting. That is, for example, lower or higher degree polynomials could also be used in accordance with the present principles. For example, the following could be used:

The quadratic interpolation at point 2 using the points at 0, 3, and 4. In this case, the filter has the weights $$f = \left(\frac{1}{6} \frac{4}{3} \frac{-1}{2}\right).$$

The quadric interpolation at 4 using 0, 2, 5, 6, and 8. In this case, the filter has the weights $$f = \left(\frac{-3}{90} \frac{20}{90} \frac{128}{90} \frac{-60}{90} \frac{5}{90}\right).$$

With respect to a fourth exemplary additional consideration with respect to polynomial based image reversible scaling, an alternative way to interpolate pixels at position 3n+1 is to use the following equation:

$$u[3n+1] = \text{round}\left(h \cdot l[2n+1] + \left(\frac{-1}{15} \frac{5}{15} \frac{-5}{15}\right)(u[3n-1] \quad u[3n] \quad u[3n+2])^T\right),$$

where $$h = \frac{16}{15}.$$

At the down-scaling stage, the equation that has to be applied in order to recover the data is as follows:

$$l[2n+1] = \text{round}\left(\frac{1}{h} \cdot u[3n+1] - \frac{1}{h}\left(\frac{-1}{15} \frac{5}{15} \frac{-5}{15}\right)(u[3n-1] \quad u[3n] \quad u[3n+2])^T\right).$$

This alternative way avoids one rounding operation at the down-scaling and up-scaling steps, which results in a slight improvement in performance. Note that this implementation would not fall in the category of poly-phase lifting approach, because the weight h multiplies the coefficient l[2n+1] before being modified.

With respect to a fifth exemplary additional consideration with respect to polynomial based image reversible scaling, another interesting way to modify the approach is setting the parameter h to 1 instead of $$h = \frac{16}{15}.$$

The h value is reduced in $\frac{1}{15}$, so the rest of the weights in $$f_3 = \left(\frac{-1}{15} \frac{5}{15} \frac{-5}{15}\right)$$

have to increase in $\frac{1}{15}$ in total. The reason is that all the weights have to sum up to 1 in order to keep the average value. For example, we can increase the last weight, thus being as follows:

$$f_3 = \left(\frac{-1}{15} \frac{5}{15} \frac{-4}{15}\right).$$

Then, the up-scaling equation at 3n+1 is as follows:

$$u[3n+1] = \text{round}\left(l[2n+1] + \left(\frac{-1}{15} \frac{5}{15} \frac{-4}{15}\right)(u[3n-1] \quad u[3n] \quad u[3n+2])^T\right);$$

and the down-scaling is as follows:

$$l[2n+1] = \text{round}\left(u[3n+1] - \left(\frac{-1}{15} \frac{5}{15} \frac{-4}{15}\right)(u[3n-1] \quad u[3n] \quad u[3n+2])^T\right).$$

Therefore, multiplication by h at the up-scale stage and the division by h at the down-scale stage are avoided. This leads to less computation cost. The drawback is that the interpolation is not exactly a cubic polynomial, so the performance may slightly decrease.

With respect to a sixth exemplary additional consideration with respect to polynomial based image reversible scaling, following the previous consideration with h=1, that is, the weights of the filter fs have to be modified so that they sum up to 1. A good solution is to set the first weight to 0, i.e., as follows:

$$f_3 = \left(0 \; \frac{5}{15} \; \frac{-5}{15}\right) = \left(0 \; \frac{1}{3} \; \frac{-1}{3}\right).$$

In this way, the computational cost is further reduced because the filter has one less tap. In fact, this version of the algorithm is the one that shows the best performance in the experiments done so far. The reason behind this good performance may be found in that this is a very simple filter that avoids rounding steps and multiplications and divisions with respect the base algorithm, yet it exactly interpolates polynomials of degree 0, being very similar to the linear and cubic interpolation polynomials.

Actually, this version of the algorithm outperforms the bi-cubic and it has less computational cost, while achieving the lossless 3/2 up- and down-scaling property.

A description will now be given regarding applications and implementations of video scalers to which the present principles may be applied.

Video scaler devices can be found embedded within video encoding and decoding equipment, or may also be found in equipment other than encoders and decoders. Some types of equipment that a video scalar may be found in include, but are not limited to, computer monitors, televisions, video editing and broadcasting equipment, cell or mobile phones, personal computers, and other audio and video devices such as, for example, video servers. In short, a video scalar may be found in any type of product which either displays video in some form or otherwise is designed for passing a video signal on the way to a display.

Video scalers can also be a completely separate box, often providing simple video switching capabilities. These units are commonly found as part of home theater or projected presentation systems. Home theater uses might include converting a standard definition digital versatile disk (DVD) or video game signal into high-definition for display on a liquid crystal display (LCD) or plasma television while obtaining the best picture quality possible. Scalers can also be found in schools, lecture theatres and modern churches, where numerous video sources (e.g., DVD video, live camera feeds, digital video interface/video graphics array (DVI/VGA) output from a computer) need to be switched between, while the highest possible resolution is maintained.

Video scalers are primarily a digital device, however they can be combined with an analog-to-digital converter (ADC, or digitizer) and a digital-to-analog converter (DAC) to support analog inputs and outputs. The present principles may be applied to these and other embodiments and implementations of video scaler, while maintaining the spirit of the present principles.

A description will now be given of some of the many attendant advantages/features of the present invention, some of which have been mentioned above. For example, one advantage/feature is an apparatus having a video scaler for performing image scaling from a first base resolution image to a higher resolution image, and from the higher resolution image to a second base resolution image. The first and the second base resolution images are equal on a pixel-by-pixel basis for an entirety of the first and the second base resolution images. A scaling function used for the image scaling is based on a polynomial function having two or more degrees.

Another advantage/feature is the apparatus having the scaler as described above, wherein the polynomial function is normalized, and at least one coefficient of the normalized polynomial function has an absolute value greater than or equal to one.

Moreover, another advantage/feature is the apparatus having the scaler wherein the polynomial function is normalized as described above, wherein the image scaling from the first base resolution image to the higher resolution image includes processing poly-phase components of the higher resolution image separately from remaining components of the higher resolution image.

Yet another advantage/feature is the apparatus having the scaler as described above, wherein the apparatus is implemented in at least one of an encoder, a decoder, and a post-processing device.

Still another advantage/feature is the apparatus having the scaler as described, wherein a 3/2 ratio is used for performing the image scaling from the first base resolution image to the higher resolution image, and a 2/3 ratio is used for performing the image scaling from the higher resolution image to the second base resolution image.

Moreover, another advantage/feature is the apparatus having the scaler as described above, wherein the image scaling is performed such that one of every two pixels in the first base resolution image is present in the higher resolution image.

Further, another advantage/feature is the apparatus having the scaler as described above, wherein the image scaling is performed by dividing the first base resolution image into even samples and odd samples, and dividing the higher resolution image into three component sets, wherein each of the component sets are processed differently while pixels within each of the component sets are processed similarly.

Also, another advantage/feature is the apparatus having the scaler as described above, wherein performing image scaling from the higher resolution image to a second base resolution image is capable of being selectively enabled or disabled.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video scaler for performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the polynomial function is normalized, and at least one coefficient of the normalized polynomial function has an absolute value greater than or equal to one.

2. The apparatus of claim 1, wherein the image scaling from the first base resolution image to the higher resolution image comprises processing poly-phase components of the higher resolution image separately from remaining components of the higher resolution image.

3. An apparatus, comprising:
a video scaler for performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein a 3/2 ratio is used for performing the image scaling from the first base resolution image to the higher resolution image, and a 2/3 ratio is used for performing the image scaling from the higher resolution image to the second base resolution image.

4. An apparatus, comprising:
a video scaler for performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the image scaling is performed such that one of every two pixels in the first base resolution image is present in the higher resolution image.

5. An apparatus, comprising:
a video scaler for performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the image scaling is performed by dividing the first base resolution image into even samples and odd samples, and dividing the higher resolution image into three component sets, wherein each of the component sets are processed differently while pixels within each of the component sets are processed similarly.

6. A method, comprising:
performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the polynomial function is normalized, and at least one coefficient of the normalized polynomial function has an absolute value greater than or equal to one.

7. The method of claim 6, wherein the image scaling from the first base resolution image to the higher resolution image comprises processing poly-phase components of the higher resolution image separately from remaining components of the higher resolution image.

8. A method, comprising:
performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein a 3/2 ratio is used for performing the image scaling from the first base resolution image to the higher resolution image (945), and a 2/3 ratio is used for performing the image scaling from the higher resolution image to the second base resolution image.

9. A method, comprising:
performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the image scaling is performed such that one of every two pixels in the first base resolution image is present in the higher resolution image.

10. A method, comprising:
performing image scaling from a first base resolution image to a higher resolution image, and from the higher resolution image to a second base resolution image,
wherein the first and the second base resolution images are equal on a pixel-by-pixel basis for an entirety of the first and the second base resolution images, and a scaling function used for the image scaling is based on a polynomial function having two or more degrees, and
wherein the image scaling is performed by dividing the first base resolution image into even samples and odd samples, and dividing the higher resolution image into three component sets, wherein each of the component sets are processed differently while pixels within each of the component sets are processed similarly.

* * * * *